Nov. 24, 1953      L. F. KOERNER      2,660,680
CRYSTAL TEMPERATURE CONTROL MEANS
Filed Aug. 9, 1950      2 Sheets-Sheet 1
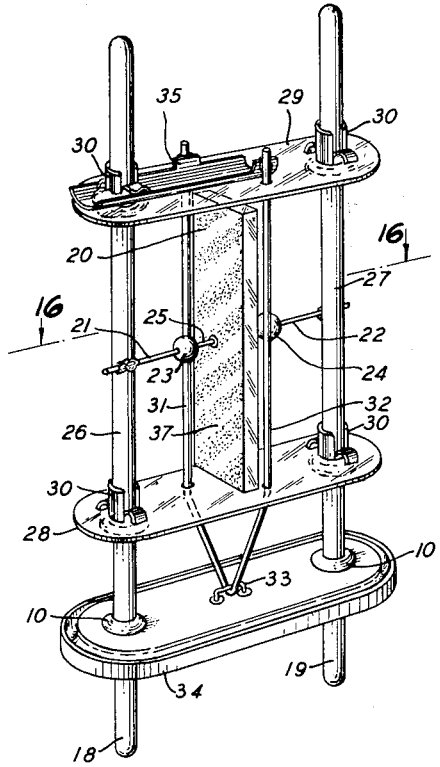
FIG. 1
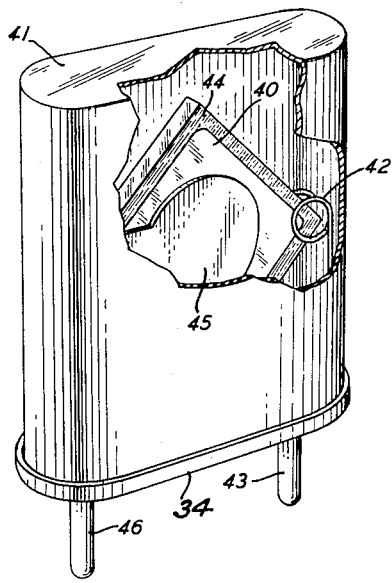
FIG. 2
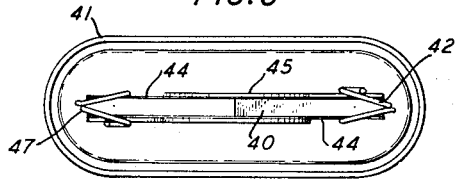
FIG. 3
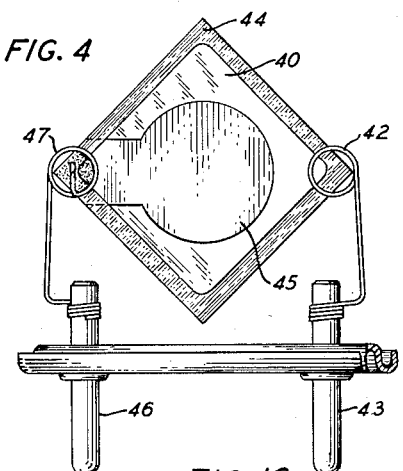
FIG. 4
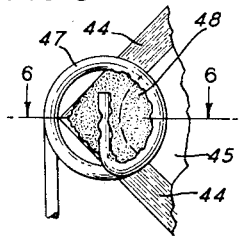
FIG. 5
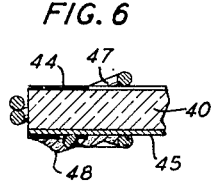
FIG. 6
FIG. 16
FIG. 7
INVENTOR
L. F. KOERNER
BY
ATTORNEY

INVENTOR
L. F. KOERNER
BY
ATTORNEY

Patented Nov. 24, 1953

2,660,680

UNITED STATES PATENT OFFICE 2,660,680

CRYSTAL TEMPERATURE CONTROL MEANS

Lawrence F. Koerner, Summit, N. J., assignor to Bell Telephone Laboratories, Incorporated, New York, N. Y., a corporation of New York Application August 9, 1950, Serial No. 178,473

14 Claims. (Cl. 310—8.1)

This invention relates to piezoelectric crystals and, more particularly, to temperature controlled crystals.

Piezoelectric crystals have been widely used in various types of electronic equipment for precise control of the frequency of oscillation. They have also been used as elements in narrow band filters and for a variety of other purposes in which the ability of the crystal to resonate sharply is of primary importance.

The effectiveness of the piezoelectric crystal for such purposes depends upon the accuracy with which the crystal temperature is maintained, since the majority of crystals do not have a constant frequency over a wide range of temperatures. While certain cuts of crystals have been developed which have a very low temperature coefficient over a substantial range of temperatures, nevertheless the dependency of frequency upon temperature remains great enough so that temperature control effective to a fraction of a degree may be necessary whenever a high degree of precision is required in the desired frequency. The requirements of such temperature controlled crystal units with respect to the heating power for maintenance of a constant crystal temperature are, for fixed installations, of relatively minor importance. However, in those cases where a considerable degree of mobility is required and where weight and space considerations are important, the use of the temperature controlled crystal has been seriously handicapped.

The objects of this invention include improving crystal heaters, providing a crystal heating unit in a form requiring no greater space than the crystal unit itself, reducing the power required for the heating of the crystal unit, and providing a crystal unit for which the heating power requirement is a small fraction of that required with prior art crystal temperature controlling means.

The present invention involves a novel means for heating crystals for the maintenance of constant temperature and which is so arranged as to add negligible bulk to the crystal unit itself and which, further, reduces the heater power requirement by substantially one order of magnitude. The invention involves locating the heater wires within the crystal container and very close to the crystal surface or forming the heater element directly on the surface of the crystal in the form of a carbon coating, for example, so that the most intimate contact is secured therewith, thus holding the required heating power to a minimum value.

In one embodiment of the invention, the heating element may consist of two high resistance heater wires disposed on opposite sides of the crystal and spaced slightly from the surface. In another embodiment of the invention, the heater element may consist of layers of graphite or other conducting material, such as a thin film of metal, applied to the periphery of the crystal on opposite sides thereof. In the latter embodiment, the heater element draws its heating current through the normal crystal supporting leads. The heating element is connected in shunt with the crystal, but, because of its high resistance, it does not interfere with the normal oscillation of the crystal. Furthermore, by the use of blocking condensers, direct current for heating may be supplied through the usual connecting leads without interference with the normal alternating-current potential flow thereto.

These and other objects and features of the invention may be more readily understood from the following detailed description when read in conjunction with the drawings, in which:

Fig. 1 is a perspective view of one embodiment of the invention utilizing resistance wire heaters as applied to a crystal unit shown with its cover removed;

Fig. 2 is a perspective view of a unit including a crystal utilizing a coating of resistance material, the housing being broken away to show a portion of the crystal mounted therein;

Fig. 3 is a top view of the crystal unit of Fig. 2 with the cover or housing removed;

Fig. 4 is a side view of the crystal unit of Fig. 2 with the cover removed;

Fig. 5 is a fragmentary view showing details of the supporting structure for the crystal;

Fig. 6 is a fragmentary sectional view taken as indicated by line 6—6 of Fig. 5;

Fig. 7 is a schematic view showing the crystal and the heating unit as they appear in a circuit;

Fig. 16 is a view in section of the apparatus shown in Fig. 1 and taken on the line 16—16 in that figure.

Figure 8:
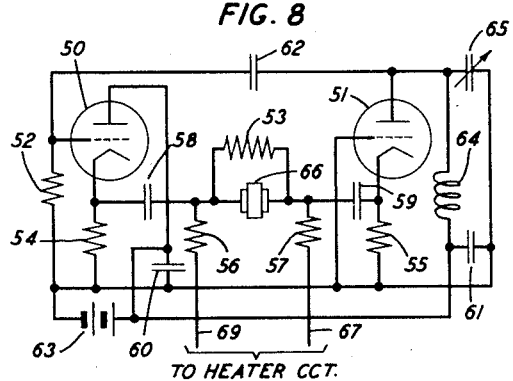
Fig. 8 is a schematic view of a crystal controlled oscillator circuit, the frequency of which is controlled by a crystal unit of the type described in the specification.

Referring now to Fig. 1, crystal 20 is supported by leads, such as 25, which in turn are fastened to leads 21 and 22 through eutectic solder balls 23 and 24, respectively. Leads 21 and 22 are secured, as by solder, to support elements or posts 26 and 27, respectively. Mica spacers 28 and 29 hold elements 26 and 27 firmly in place by means of metal eyelets, such as 30. Crystal 20 is of conventional type, such as a quartz crystal, and is coated on its opposite surfaces, such as 37, with a conducting material, such as gold.

Heater elements 31 and 32, which may be of resistance wire, such as Nichrome, are supported at one end by a wire element 33 which in turn is secured to base 34. Both elements 33 and 34 should be of a suitable conducting material such as metal. The elements 26 and 27 pass through glass insulating eyelets 10 in the base 34. The other ends of heater elements 31 and 32 extend through apertures in mica spacer 29 and are affixed to a spring 35 which holds the heater elements 31 and 32 securely in position so that they will maintain a substantially constant distance from crystal 20 at all points. The spring 35 can be of any conducting material that has good elasticity properties, such as Phosphor bronze alloy, and is securely fastened to the element 26 by welding or soldering for good electrical conduction. It is to be noted that the heating of the crystal is obtained by radiation from resistance elements 31 and 32 which are mounted permanently within the crystal housing and close to the crystal unit. The heater circuit may be traced from terminal 18 through element 35, heater elements 31 and 32, and to element 33, which may be grounded. It will be observed that the heater elements 31 and 32 are not shunted across the crystal 20, since the resistance of said heater elements if small in comparison with that of the crystal would interfere with the signals received or generated by the crystal.

In the device illustrated in Fig. 2, the crystal 40 is supported within envelope 41 by supporting leads such as 42, which are fastened to terminals such as 43. A resistance material, such as graphite, is coated around the edge portion 44 of one or both major faces of crystal 40 or along the periphery of the crystal. The two opposing surfaces of the crystal have on a restricted area thereof a coating of a good conducting material, such as gold, one of said coatings being designated as 45. The graphite coatings 44 on crystal 40 act as the heater element. A potential applied across the diagonally opposite corners of crystal 40 produces a current flow through the graphite coatings, thus heating the crystal. This potential can be applied to terminals 46 and 43. It is to be noted that the graphite resistance is high in comparison with the resistance of the crystal, thus minimizing the effect of the shunting graphite resistance upon the signals received or generated by the crystal.

Fig. 3, which is a top view of the device illustrated in Fig. 2, shows the crystal 40 and the gold plating 45 thereon, the supporting elements 42 and 47, and the envelope 41. Also shown is the graphite coating 44.

In Fig. 4 the crystal and its supporting structure as well as the electrical terminals are clearly illustrated. The crystal 40 having its edge portions coated with graphite 44 is supported by elements 42 and 47 which in turn are supported by terminals 46 and 43. The power source for the heating element 44 may be applied across terminals 46 and 43. Elements 47 and 42 are secured to crystal 40 by a silver paste 48, as is shown in detail in Fig. 5. The graphite 44 is deposited over one extremity of gold coating 45, and the silver paste 48 is deposited on top of the graphite coating. It is to be noted that the silver paste joint must be baked in order to become fast. In Fig. 6 is shown the supporting element 47 which also brings in the heater current as well as being an output terminal of the crystal. Also shown are the crystal 40, gold plating 45, the graphite plating 44, and the silver paste bond 48.

Referring now to Fig. 8, the two vacuum tubes 50 and 51 may be in the form of a double triode, such as Western Electric Vacuum Tube Code No. 396A/2C51. The circuit in its entirety constitutes a conventional cathode-follower oscillatory circuit wherein resistances 52 and 53 are approximately 5,000 ohms, resistances 54 and 55 approximately 100 ohms, resistances 56 and 57 are approximately 500 ohms and capacitances 58, 59, 60, and 61 are approximately .01 microfarad, capacitance 62 is about 100 microfarads and battery supply 63 is about 150 volts. The inductance 64 and the variable capacitance 65 comprise a circuit which is tuned to the natural oscillating frequency of the crystal 66. The graphite resistance 53 is a heater element for the crystal, as shown in Figs. 2 and 4, and the two resistances 56 and 57 are placed in the circuit merely to offer a large impedance to the oscillatory circuit so as not to interfere therewith. As is indicated in Fig. 8, the two leads 69 and 67 go to the heater circuit, which will be described in more detail later.

Figure 9:
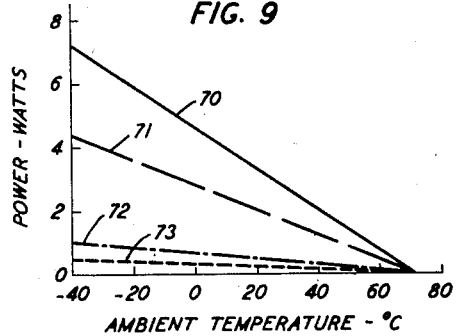
Fig. 9 is a graph showing the relation between the ambient temperature and the power required to heat the crystal shown in Fig. 8.
Figure 10:
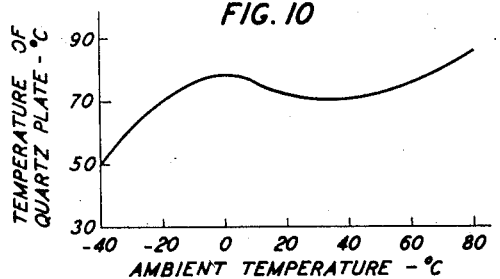
Fig. 10 is a curve showing the effect of ambient temperature of the quartz crystal of Fig. 8.

Figs. 9 and 10 show some of the characteristics of the heater circuit used with the circuit shown in Fig. 8. In Fig. 9, the curves 70 and 71 show the power in watts necessary to maintain the crystal at a temperature of 70° C. with different ambient temperatures, when known methods of heating the crystal are utilized. Curves 72 and 73 illustrate the power required to accomplish the same function with devices constructed in accordance with the invention shown in Fig. 8. More specifically, the curve 72 illustrates the total power used in the heater circuit, whereas curve 73 shows the power consumed in the heating element 53 only. It can be seen that this invention reduces the required amount of heater power by approximately one order of magnitude. In Fig. 10 is shown the degree of accuracy with which temperature of the crystal 66 can be maintained. At a −40° C. ambient temperature, the temperature of the crystal is +50° C. and at an ambient temperature of +80° C. the crystal temperature is +85° C.

Figure 11:
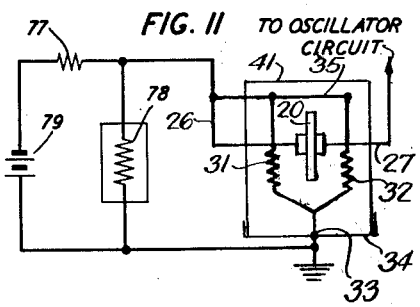
Fig. 11 is a circuit diagram showing one arrangement of thermistors in a crystal heater control circuit, in which the crystal is not shunted with the heater.

In Fig. 11, there is shown a control circuit for regulating the current through 5-ohm wire heater element 31—32 of the type shown in Fig. 1, which supplies the heat for crystal 20. Four-ohm resistance 77 is placed in series with heater element 31—32, and thermistor 78 is in parallel with said heater element. The 6.3-volt power supply is designated by the reference character 79. Since it is desired to maintain the crystal at a substantially constant temperature, the object of any heat control circuit is to regulate the current through the heater element 31—32 so that as the ambient temperature changes, the heater current will also vary so that the temperature of crystal 20 will always be substantially constant. Thus, if the ambient temperature should rise, the current through element 31—32 should decrease; and, conversely, if the ambient temperature should decrease, the current through element 31—32 should increase. By shunting heater element 31—32 with thermistor element 78, this function is realized. As the ambient temperature rises, the resistance of the thermistor becomes less, thus shunting more current therethrough and reducing the current through heater element 31—32. If the ambient temperature decreases, the resistance of the thermistor element 78 increases, causing more current to pass through heater element 31—32. The resistance characteristic of thermistor 78 usually is not ideal, however. The crystal 20 is to be connected to an oscillator circuit.

Figure 12:
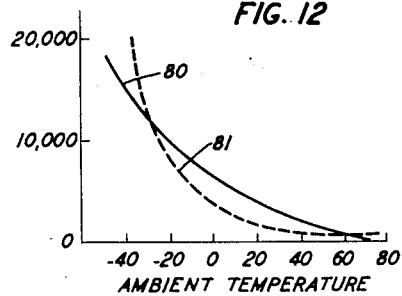
Fig. 12 shows the relationship between the ideal resistance curve with respect to change in ambient temperature for the thermistor shown in Fig. 11 and the actual resistance curve of the thermistor shown in Fig. 11.
Figure 13:
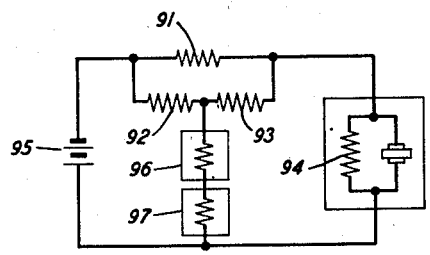
Fig. 13 illustrates another crystal heater control circuit utilizing thermistors in conjunction with a potentiometer circuit.

Fig. 12 shows the ideal resistance curve 80 for a resistance element 96—97, as shown in Fig. 13, required to exactly control the current through heater element 94 so as to maintain the temperature of the crystal of Fig. 13 constant. The actual resistance characteristic of the thermistor used therein is represented by curve 81. It can be seen therefrom that at very low temperatures, the resistance of the thermistor is too high, thus causing the temperature of the crystal to be too high. At slightly higher temperatures, the resistance of the thermistor is lower than the ideal resistance, thus causing the temperature of the crystal to become too low. Finally, it can be seen that the resistance of the thermistor never drops to zero, whereas if the ambient temperature equals the required temperature of the crystal, the heater current through element 31—32 should be equal to zero, which can only be accomplished if the thermistor element 78 short-circuits. Nevertheless, the circuit shown in Fig. 11 does produce substantially better results than can be obtained with conventional heater control circuits.

Figure 14:
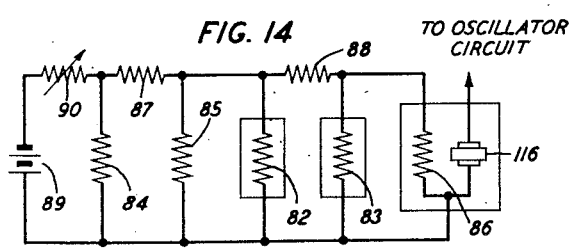
Fig. 14 shows still another form of crystal heater control circuit utilizing resistances and thermistors.
Figure 15:
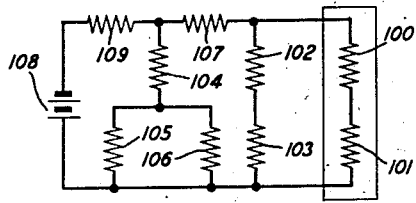
Fig. 15 shows still another form of circuit for controlling the current through the crystal heating elements utilizing resistances and thermistors.

Figs. 13, 14, and 15 illustrate other control circuits which may be utilized in the practice of this invention. Fig. 13 illustrates a potentiometer arrangement wherein resistance 91 is 10,000 ohms, resistances 92 and 93 are 1,000 ohms, heater element 94 is 5,000 ohms, and the battery supply 95 is 80 volts. Thermistor elements 96 and 97 are in series and have a resistance of 3,150 ohms at 25° C. with a temperature coefficient of —.038 at that temperature. This particular circuit has a high impedance from the heater element terminals and thus is particularly suitable for use with the graphite type heater element for the crystal.

In Fig. 14, a two-stage control circuit is shown employing thermistor element 82, thermistor element 83, 16-ohm resistance 84, 24-ohm resistance 85 all in parallel with 2½-ohm heater element 86. Resistance element 84 is coupled to resistance element 85 through 2-ohm resistance element 87, and thermistor 82 is coupled to thermistor 83 through resistance 88. The 6.3-volt power supply 89 is connected across resistance 84 through voltage regulator 90. By the proper choice of resistance elements and thermistor elements, it is possible to more closely approximate the desired resistance necessary to maintain the proper current through heater element 86. The crystal 116 is to be connected to an oscillator circuit.

Fig. 15 illustrates another type circuit, wherein thermistor element 100 is placed in series with the 60-ohm heater element 101. Shunting the elements 100 and 101 are 39-ohm resistor 102 in series with thermistor 103 and 30-ohm resistor 104 in series with the parallel combination of thermistors 105 and 106. These two shunting circuits are shunted by 78-ohm resistor 107. The 20-volt power supply 108 is coupled to the circuit through 18-ohm resistor 109.

The use of the thermistor element 100 in series with the heater element 101 will increase the over-all resistance of the oven at higher ambient temperatures, since the resistance of the thermistor will increase as the heater current decreases, and the heater current will decrease with increasing ambient temperatures.

Many different type control circuits utilizing resistances and thermistors and other circuit elements may be devised to produce resistance characteristics over a specified ambient temperature range that will accurately control the current through the heater element. Only a few have been shown in this application. It is to be understood, however, that the scope and spirit of this invention are intended to embrace the various changes in circuit design that are apparent to one skilled in the art.

What is claimed is:

1. A piezoelectric crystal unit comprising a supporting structure including a pair of metallic supports, a piezoelectric crystal mounted by said structure, electrodes on said crystal, electrical connections between said electrodes and said supports, and heating means for controlling the temperature of said crystal, during operation of said crystal, comprising a pair of resistance elements extending in parallel relation with said crystal and mounted by said structure and on opposite sides of said crystal, said resistance elements being in electrical connection with and energizable through said structure.

2. A piezoelectrical crystal unit in accordance with claim 1, wherein said resistance elements are wires each adjacent a respective face of said crystal.

3. A piezoelectric crystal unit in accordance with claim 1, wherein said resistance elements are resistive coatings on opposite faces of said crystal, said resistance elements and said piezoelectric crystal being in an electrical parallel relation.

4. A piezoelectric crystal unit in accordance with claim 1 comprising means electrically connecting said resistance elements in parallel with said electrodes.

5. In combination, a piezoelectric crystal having connecting terminals associated with surface plating on said crystal covering less than the entire area of its major faces, heating means for said crystal, to maintain said crystal at a required temperature during operation of the crystal and comprising a coating of material having a resistance high in comparison to the resistance of said crystal distributed along the edges of said crystal, and conducting means supporting said crystal and connecting said terminals to said heating means.

6. In combination, a piezoelectric crystal having connecting terminals connected to the surface plating on said crystal covering less than the entire area of its major faces, heating means for said crystal to maintain said crystal at a required temperature during operation of the crystal and comprising a coating of graphite having a resistance high in comparison to the resistance of said crystal distributed in the form of a band along the edges of said crystal, said heating means being electrically connected in parallel with the electrodes of said crystal, a power supply, and circuit means comprising a network for connecting said power supply to said heating means through said connecting terminals and for supplying a variable current to said heating means so as to maintain the temperature of said crystal substantially constant over a range of ambient tmperatures.

7. In combination, a piezoelectric crystal having its major surfaces plated with a conducting material, terminals connected to said plated surfaces, heating means for said crystal, to maintain said crystal at a required temperature during operation of the crystal and comprising a coating of graphite distributed in the form of a band along the edges of said crystal, said heating means being electrically connected to said terminals and in parallel with said crystal, said heating means further comprising a power supply and a circuit network means to maintain a variable current through said graphite coating in order to maintain said crystal temperature substantially constant over a range of ambient temperatures, said circuit network comprising a first resistive element having a negative temperature coefficient of resistance arranged in parallel with said power supply and said graphite coating.

8. A combination in accordance with claim 7, wherein said circuit network comprises a plurality of first resistive means having negative temperature coefficients of resistance in parallel with said graphite, and a power supply in series with second resistive means applied across said first resistive means.

9. A combination in accordance with claim 8, wherein said circuit network comprises a second resistive element having a negative temperature coefficient of resistance and connected in series with said graphite coating.

10. In combination, a piezoelectric crystal having a plating on the major surfaces thereof, a supporting rod placed on either side of said crystal, mica spacers fitted over said supporting rods, connecting terminals secured at one end to said supporting rods and secured at the other end to said plating on said crystal surfaces, said connecting terminals being of sufficient strength to suspend said crystal without further support, and first means for heating said crystal, said means comprising a U-shaped arrangement of heater wires held in spaced relation by said mica spacers and positioned adjacent to and substantially parallel to the major surfaces of said crystal, a conducting plate mounted on one of said mica spacers and in electrical connection with said heater wires, said heating means further comprising second means to supply current to said heater wires.

11. A combination in accordance with claim 10, wherein a circuit network is interposed between said second means and said heater wires, said network comprising a resistance having a negative temperature coefficient of resistance connected in parallel with said heater wires.

12. A combination in accordance with claim 10, wherein a resistive element having a negative temperature coefficient of resistance is connected in series with said heater wires.

13. A combination in accordance with claim 10, wherein a circuit network is interposed between said second means and said heater wires, said network comprising a plurality of first resistive means having negative temperature coefficients of resistance in parallel with said heater wires, and a power supply in series with a second resistive means applied across said first resistive means.

14. A combination in accordance with claim 11, wherein said circuit network comprises a third resistive element having a negative temperature coefficient of resistance connected in series with said heater wires.

LAWRENCE F. KOERNER.

References Cited in the file of this patent

UNITED STATES PATENTS

| Number | Name | Date |
|---|---|---|
| 1,930,763 | Levy | Oct. 17, 1933 |
| 2,388,242 | Arndt | Nov. 6, 1945 |
| 2,393,429 | Swinehart | Jan. 26, 1946 |
| 2,479,987 | Williams | Aug. 23, 1949 |
| 2,505,370 | Sykes | Apr. 25, 1950 |

FOREIGN PATENTS

| Number | Country | Date |
|---|---|---|
| 570,043 | Great Britain | June 20, 1945 |